(12) United States Patent
Parvin

(10) Patent No.: US 7,402,099 B1
(45) Date of Patent: Jul. 22, 2008

(54) CRUSHING DEVICE FOR A BIRD'S HEAD

(76) Inventor: David Allen Parvin, 9938 Tavernor Rd., Wilton, CA (US) 95693

( * ) Notice: Subject to any disclaimer, the term of this patent is extended or adjusted under 35 U.S.C. 154(b) by 0 days.

(21) Appl. No.: 11/060,990

(22) Filed: Feb. 17, 2005

(51) Int. Cl.
- *A22C 17/06* (2006.01)
- *A22B 3/00* (2006.01)
- *A22B 3/10* (2006.01)

(52) U.S. Cl. .............. 452/103; 452/102; 30/120.3

(58) Field of Classification Search ............ 452/52, 452/57, 58, 59, 60, 61, 62, 63, 64, 102, 103, 452/104, 105, 54; 30/120.1, 120.2, 120.3, 30/120.4, 120.5
See application file for complete search history.

(56) References Cited

U.S. PATENT DOCUMENTS

| | | | | |
|---|---|---|---|---|
| 368,403 A * | 8/1887 | Lamb | ............ | 452/64 |
| 433,151 A * | 7/1890 | Schonemann | ............ | 452/64 |
| 549,008 A * | 10/1895 | Olson | ............ | 452/54 |
| 1,081,851 A * | 12/1913 | Michael | ............ | 452/64 |
| 1,085,793 A * | 2/1914 | Boettger | ............ | 452/64 |
| 1,134,265 A * | 4/1915 | Harper | ............ | 30/120.3 |
| 1,149,517 A * | 8/1915 | Hogan | ............ | 452/54 |
| 1,410,640 A * | 3/1922 | Baker | ............ | 452/54 |
| 1,503,372 A * | 7/1924 | Pacholke | ............ | 452/61 |
| 1,580,790 A * | 4/1926 | MacAllister | ............ | 452/63 |
| 1,729,845 A * | 10/1929 | Sawicki | ............ | 452/54 |
| 1,783,699 A * | 12/1930 | Butcher | ............ | 452/54 |
| 2,081,229 A * | 5/1937 | Fisher et al. | ............ | 452/63 |
| 2,378,084 A * | 6/1945 | Jackson | ............ | 30/120.3 |
| 2,434,587 A * | 1/1948 | Balliet | ............ | 452/65 |
| 2,466,489 A * | 4/1949 | Silfen | ............ | 452/54 |
| 2,799,310 A * | 7/1957 | Jacobs | ............ | 30/120.3 |
| 3,048,208 A * | 8/1962 | Umanoff | ............ | 30/120.3 |
| 5,052,107 A * | 10/1991 | Hirzel | ............ | 30/120.3 |
| 5,290,186 A * | 3/1994 | Juranitch | ............ | 452/149 |
| 5,566,452 A * | 10/1996 | Sample | ............ | 30/120.3 |
| 6,151,782 A * | 11/2000 | Le Bail | ............ | 30/120.3 |
| D450,366 S * | 11/2001 | Dumlao | ............ | D22/119 |

FOREIGN PATENT DOCUMENTS

| | | | |
|---|---|---|---|
| DE | 4024030 | * | 2/1991 |
| GB | 1422418 | * | 1/1976 |
| WO | WO 90/04923 | * | 5/1990 |

* cited by examiner

*Primary Examiner*—David J Parsley
(74) *Attorney, Agent, or Firm*—Risto A. Rinne, Jr.

(57) ABSTRACT

An apparatus for crushing a bird's head includes a first member and a second member that are pivotally attached and which are adapted to pivot about an axis. An inner arcuate recessed area is provided on an interior side of each member intermediate a second end and a first end. The arcuate recessed area is adapted to receive a bird's head with a bill or beak of the bird extending beyond the arcuate area. A ridge or protrusion protrudes from at least one member so that it initially makes contact with the bird's head when the first and second members are urged together. This concentrates the force that is applied to the head and also prevents the bird from moving out of the apparatus. The members are then urged together and the bird's head is crushed thereby instantly killing the bird.

2 Claims, 2 Drawing Sheets

CRUSHING DEVICE FOR A BIRD'S HEAD

BACKGROUND OF THE INVENTION

1. Field of the Invention

The present invention, in general relates to birds and waterfowl and, more particularly, to a humane way of killing a bird.

Countless numbers of birds are killed by people everyday, most commonly for food. Chickens, ducks, geese, game birds, and other types of birds including waterfowl are either raised for human consumption or are killed by hunters. A quick, and therefore humane, economical way of killing birds is desired that an individual who, on such occasion, may use. Even the farmer who must kill an occasional chicken for dinner desires a clean and merciful way to accomplish the task.

Waterfowl hunters share a common experience of shooting and dropping their intended quarry, which can include Widgeon, Pintail, Mallard, Wood and other ducks as well as Canada, Snow, Speckle Belly or other types of geese. Often, the birds are not instantly killed by the wounds they receive by gunshot.

After fetching the birds, the hunter may then commonly "ring" the bird's neck (i.e., twist the neck) in order to kill them. The hunters then place the presumed "dead" birds near them in a blind while they continue to hunt until the maximum limit is obtained or until they run out of time or light.

However, quite often the presumed "dead" birds are still able to slowly move their feet and legs sufficient to leave the blind. If the "dead" bird makes its way into the nearby water, it will instinctively swim away until it finally succumbs and drowns. Many birds have been lost because of these types of instinctual reflex reactions that keep them moving or because a hunter has assumed the bird was dead and immobile when, in fact, it was not.

Edible game is thereby often wasted in this manner. Also, the "dead" or dying bird may be forced to experience a protracted and somewhat inhumane death. The hunter, busy in his blind, cannot detract himself from his future quarry for a lengthy period of time to ascertain that his present kill is really dead and immobile. A way to quickly and humanely kill a bird is required.

Accordingly, there exists today a need for a device that can quickly kill a bird. There is, therefore, a need for a crushing device for a bird's head that helps ameliorate the above-mentioned difficulties.

Clearly, such an apparatus would be a useful and desirable device.

2. Description of Prior Art

Commercial methods of killing animals are, in general, known. While the structural arrangements of the above described devices may, at first appearance, have certain similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a crushing device for a bird's head that stops instinctual movement by the bird.

It is also an important object of the invention to provide a crushing device for a bird's head that is easy to use.

Another object of the invention is to provide a crushing device for a bird's head that is quick to use.

Still another object of the invention is to provide a crushing device for a bird's head that quickly, and therefore humanely, ends the life of a bird.

Still yet another object of the invention is to provide a crushing device for a bird's head that reduces the period of suffering by a bird during its death.

Yet another important object of the invention is to provide a crushing device for a bird's head that is economical to manufacture.

Still yet another important object of the invention is to provide a crushing device for a bird's head that is lightweight, compact, and easy to transport.

A first continuing object of the invention is to provide a crushing device for a bird's head that can be formed from a variety of materials, including wood, bronze, and composite materials.

A second continuing object of the invention is to provide a crushing device for a bird's head that provides a mechanical advantage that is used to crush the head of a bird.

A third continuing object of the invention is to provide a crushing device for a bird's head that focuses a crushing force that is applied to a specific area of a bird's head.

A fourth continuing object of the invention is to provide a crushing device for a bird's head that helps retain the birds head in position during use.

A fifth continuing object of the invention is to provide a crushing device for a bird's head that is aesthetically appealing to a bird hunter.

Briefly, a crushing device for a bird's head that is constructed in accordance with the principles of the present invention has a first upper member and a second lower member that are pivotally attached at a first end thereof and which are adapted to pivot about an axis proximate the first end. An inner arcuate recessed area is provided on an interior side of each member intermediate a second end and the first end. The arcuate area is adapted to receive a bird's head with a bill or beak of the bird extending beyond the arcuate area and disposed so that a plane of the bill or beak is generally perpendicular with respect to a longitudinal axis of each member. A ridge or protrusion preferably protrudes from at least one arcuate recessed area so that the ridge or protrusion initially makes contact with the bird's head when the first and second member are urged toward each other. The ridge or protrusion concentrates the force that is applied to the bird's head while preventing the head from exiting from the apparatus. The first and second members are then urged together at the second end, thereby providing a mechanical advantage wherein the bird's head is crushed at a crucial area of the brain thereby instantly killing the bird and preventing instinctual motion by the bird that could otherwise cause the bird to leave the area under its own power.

DETAILED DESCRIPTION OF THE INVENTION

Figure 1:
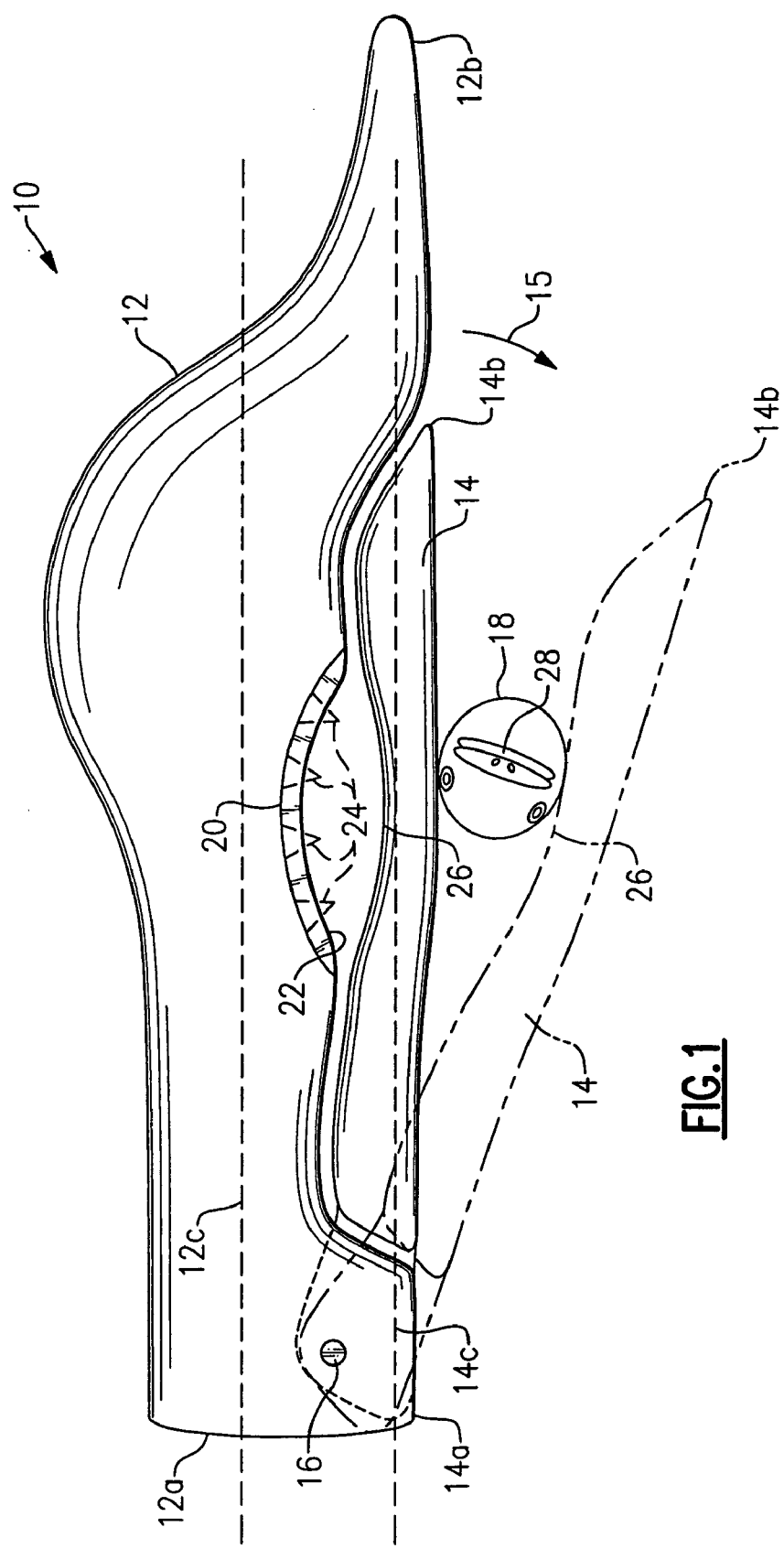
FIG. 1 is a side view of a crushing device for a bird's head.
Figure 2:
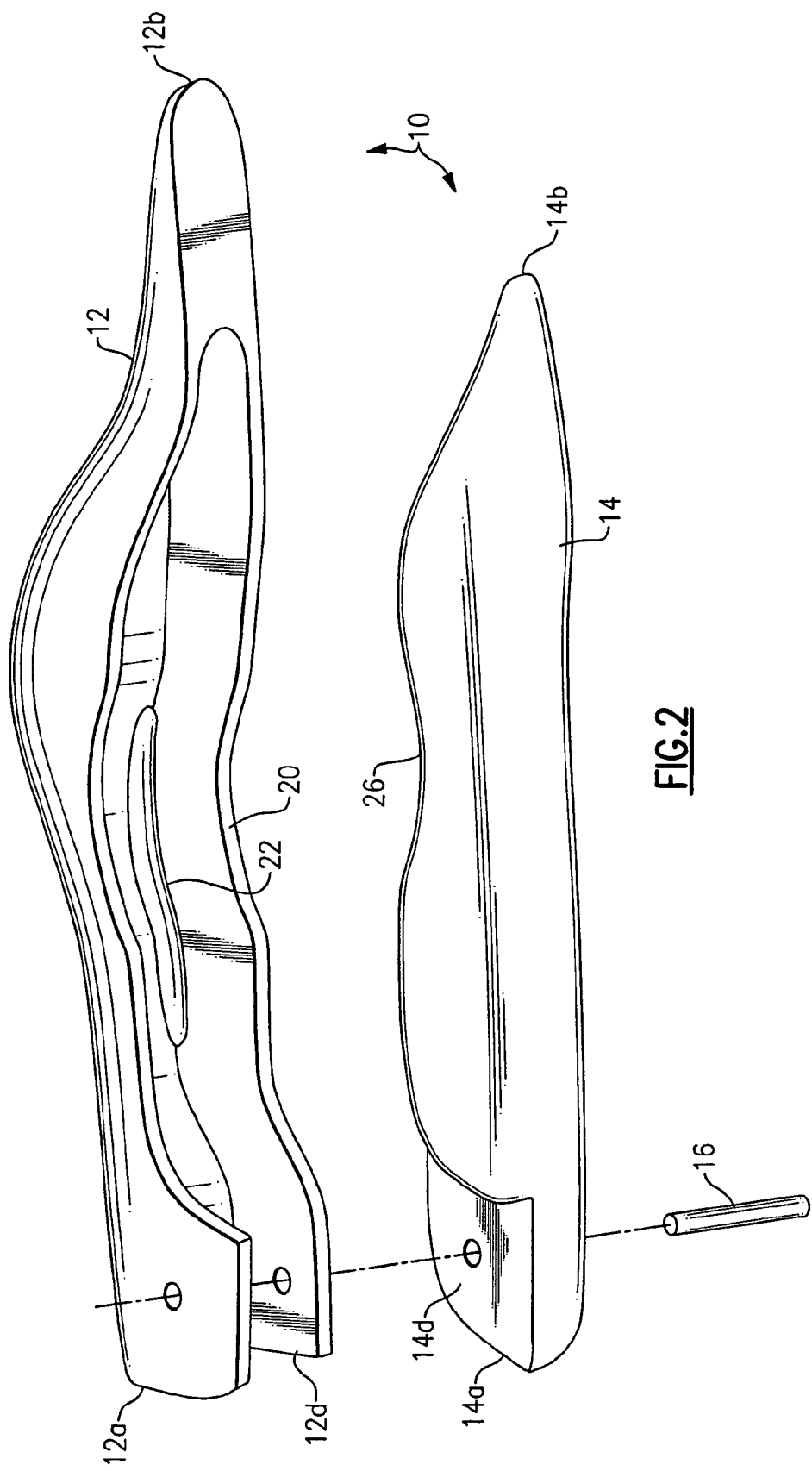
FIG. 2 is a exploded view of the crushing device for a bird's head of FIG. 1, in perspective.

Referring to FIG. 1 and FIG. 2 is shown, a crushing device for a bird's head, identified in general by the reference numeral 10.

A first upper member 12 and a second lower member 14 are pivotally attached by a pin 16 at a first end of each 12a, 14a respectively, and are adapted to pivot about a longitudinal axis of the pin 16 that passes through the upper member 12 and the lower member 14.

A second end of each, 12b, 14b respectively, are disposed distally from the respective first ends 12a, 14a.

A first longitudinal axis 12c extends along the length of the first upper member 12. A second longitudinal axis 14c extends along the length of the second lower member 14.

FIG. 1 shows the device 10 in a closed position (solid lines) and in an open position (dashed lines) adapted to receive a bird's head 18 therein. In the closed position, the device 10 includes the preferred overall shape of a head of a duck, goose, or other type of bird.

In the closed position, the first longitudinal axis 12c and the second longitudinal axis 14c are substantially in parallel alignment with respect to each other. In the open position, the lower member 14 is urged away from the upper member 12 in a direction as shown by arrow 15.

A first inner arcuate recessed area 20 is provided on an interior side of the upper member 12. The first inner arcuate recessed area 20 includes a first curved portion that has been removed from the upper member 12 intermediate the first end 12a and the second end 12b thereof.

A center ridge 22 protrudes above the general shape of the first inner arcuate recessed area 20 and extends along its longitudinal length, generally parallel with respect to the first longitudinal axis 12c. The center ridge 22 generally includes a V-shaped cross-section that is widest at the upper member 12 and terminates in a curved line distally away from the upper member 12.

If preferred, the center ridge 22 can be replaced by one or a plurality of protrusions 24 (dashed lines). The protrusions may include a generally cone, pyramid or other shape with a plurality of pointed ends that extend away from the upper member 12.

A second inner arcuate recessed area 26 is provided on an interior side of the lower member 14 immediately under the first inner arcuate recessed area 20. The second inner arcuate recessed area 26 includes a second curved portion that has been removed from the lower member 14 intermediate the first end 14a and the second end 14b thereof.

Together, the first and second inner arcuate recessed areas 20, 26, provide a sufficiently large-enough opening to receive the bird's head 18, preferably over one-half inch in width, with a bill or beak 28 of the bird extending beyond both of the inner arcuate areas 20, 26 and disposed so that a plane of the bill or beak 28 is generally perpendicular with respect to the first and second longitudinal axes 12c, 14c of the upper and lower members 12, 14.

The bird's head 18 is placed sideways in the first and second inner arcuate recessed areas 20, 26 with the bill or beak 28 extending beyond the device 10.

The lower member 14 is then placed on a surface with the bird's head 18 in position while force is applied proximate the second end 12b of the upper member 12 sufficient to urge the upper member 12 toward the lower member 14 in the direction of arrow 15.

The ridge 22 or protrusions 24 are the first part of the upper member 12 to contact the bird's head 18. They help retain the head 18 in position and they also serve to focus and concentrate a crushing force that is applied to the bird's head 18. A mechanical advantage is also supplied by the overall length of the first member 12. Force is applied until the first and second longitudinal axes 12c, 14c are parallel with respect to each other.

In a swift closing motion of the device 10, the bird's head 18 is crushed just beyond the bill or beak 28 instantly and humanely killing the bird and preventing even a continued instinctual movement by the bird that could otherwise cause it to move away from the area.

FIG. 2 shows the first upper member 12, second lower member 14 and the pin 16 in a spaced-apart orientation. The lower member 14, at a location that is proximate the first end 14a, includes a narrower width portion 14d that is adapted to enter into a channel 12d that is provided in the first member 12. The pin 16 passes through openings provided in the first and second members 12, 14, thereby securing the second member 14 to the first member 12 and allowing the second member to pivot around a center longitudinal axis of the pin 16 with respect to the first member 12.

The device 10 is provided in any size for any type or species of bird and of any preferred material. It can easily be carried in a pocket or hunting bag for use in a hunting blind when needed. If preferred, the device 10 can be squeezed with both hands. It can also include any preferred shape, although an especially preferred shape resembles that of a neck and head portion of a bird.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A crushing device for a bird's head, comprising:
(a) means for retaining a bird's head in said device and wherein said means for retaining a bird's head includes a first upper member and a second lower member that are pivotally attached with respect to each other and adapted to pivot about an axis and wherein said first upper member includes a first inner arcuate recess area and wherein said second lower member includes a second inner arcuate recess area that is disposed under said first inner arcuate recess area, and wherein said first inner arcuate recess area includes a concave shape and wherein said second inner arcuate recess area includes a concave shape and wherein when said first upper member and said second lower member are pivoted about said axis into a first closed position, a generally oval-shaped opening is provided therein between said first inner arcuate recess area and said second inner arcuate recess area, and wherein when said first upper member and said second lower member are disposed in said first closed position said oval-shaped opening is open at each opposite side of said device sufficient to allow at least a portion of beak of said bird's head to extend from said opening and to allow a neck of said bird to extend from an opposite end of said opening and wherein said beak is not crushed and said beak is not cleaved when said device is disposed in said first position;
(b) means for crushing said head sufficient to kill said bird when said head is disposed between said first inner arcuate recess and said second inner arcuate recess area and said first upper member and said second lower member are disposed in said first closed position, and wherein said means for crushing does not include cleaving of said head of said bird or a cleaving of said neck of said bird; and
(c) wherein said crushing device for a bird's head is handheld during use and wherein said crushing device for a bird's head is not fixedly mounted to any other structure, and wherein when said crushing device for a bird's head is disposed in said first position, it is adapted for portage and it includes an overall size that is adapted for placement in a pocket of a garment, and wherein when said first upper member and said second lower member are disposed in said first closed position, said device includes an overall shape that resembles a beak of a bird and a head of a bird and a neck of a bird, and wherein when said first upper member and said second lower member are disposed in said first closed position said second lower member is disposed in a recessed area provided in said first upper member, and wherein when said first upper member and said second lower member are disposed in said first closed position an outer bottom surface of said second lower member rearward linearly along a bottom portion of said second lower member, and wherein a front portion of said device includes a front-most distal point and wherein said front portion of said device resembles said beak of a bird and wherein said front portion of said device that resembles said beak of said bird is attached to said first upper member and wherein an upper surface of said device is disposed on said first upper member on an opposite side of said device with respect to said bottom surface when said device is disposed in said first position and wherein when said device is disposed in said first position and is viewed from the side and extending from said front-most distal point toward an opposite rear portion of said device said front portion includes a gradual upward first curvature that begins at said front-most distal point and wherein said upward curvature rises to a peak elevation at a second end of said first curvature and wherein a portion of said first upper member that is disposed forward of said peak elevation resembles a top and forward half of said head of a bird and said beak of a bird, and wherein said peak elevation is maximally disposed away from said bottom portion of said device in relation to the rest of said first upper member when said device is disposed in said first position, and wherein said peak elevation is disposed forward of a center of said second inner arcuate recess area and wherein when continuing said viewing of said device from the side extending rearward from said peak elevation toward said opposite rear portion of said device a second curvature begins and extends downward from said peak elevation in a direction that is both rearward and toward said bottom portion, and wherein said device includes a third curvature that is attached at one end thereof to said second curvature and curves in an opposite direction with respect to said second curvature, and wherein said second curvature and said third curvature include a generally S-shape thereto, and wherein said first upper member extends rearward from an end of said third curvature in a generally parallel orientation with respect to said bottom portion of second lower member when said device is in said first position, and wherein said peak elevation is disposed on said device at a location that resembles said top of said head of a bird and wherein said remaining amount of said upper portion that is disposed rearward of said third curvature resembles said neck of a bird, wherein the lower surface of the first upper member comprising a flat portion extending from said front most distal point and said flat portion connects directly to a first lower curved portion curving upward from said flat portion, said first lower curved connected directly to a second lower curved portion extending upwardly from said first lower curved portion, said second lower curved portion partially forming said first inner arcuate recess area, said second lower member comprising an enlarged front distal end which is adapted to fit into said first lower curved portion of said first upper member when the device is in the first position, said second lower member comprising a top concave surface portion directly connected to said enlarged front distal end, said top concave surface of said second lower member forming said second inner arcuate recess area, and wherein said first upper member includes at least one protrusion and wherein said at least one protrusion is disposed in said first inner arcuate recess area and wherein said at least one protrusion extends away from said first upper member toward said second inner arcuate recess, wherein said at least one protrusion includes a generally pyramid shape.

2. The device of claim 1 wherein said first upper member includes a ridge.

* * * * *